(12) United States Patent
McIntosh

(10) Patent No.: US 10,967,974 B2
(45) Date of Patent: Apr. 6, 2021

(54) LAVATORY WASH BASIN HANDLE ASSEMBLY

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 956 days.

(21) Appl. No.: 14/504,902

(22) Filed: Oct. 2, 2014

(65) Prior Publication Data

US 2016/0096624 A1    Apr. 7, 2016

(51) Int. Cl.
| B64D 11/02 | (2006.01) |
| A47K 17/02 | (2006.01) |
| E03C 1/18 | (2006.01) |

(52) U.S. Cl.
CPC ............. *B64D 11/02* (2013.01); *A47K 17/02* (2013.01); *E03C 1/18* (2013.01)

(58) Field of Classification Search
CPC .......... B64D 11/02; A47K 17/02; E03C 1/18; E03C 1/186
USPC ........................................... 4/519, 523, 621
See application file for complete search history.

(56) References Cited

U.S. PATENT DOCUMENTS

| 4,327,452 A | * | 5/1982 | Swatzell | ................ | A45D 44/10 |
| | | | | | 4/515 |
| 4,385,408 A | * | 5/1983 | Rhodes | ................... | A47K 1/08 |
| | | | | | 4/523 |
| 5,690,237 A | * | 11/1997 | Marzec | ................... | A47K 3/003 |
| | | | | | 211/105.1 |
| 6,502,254 B1 | * | 1/2003 | De Menna | .......... | A47B 77/022 |
| | | | | | 4/621 |
| 8,185,983 B2 | | 5/2012 | Wierenga | | |
| 2006/0230576 A1 | * | 10/2006 | Meine | .................... | A47K 17/00 |
| | | | | | 16/110.1 |
| 2008/0265092 A1 | | 10/2008 | Cooper | | |
| 2012/0261509 A1 | | 10/2012 | Gran et al. | | |
| 2015/0015025 A1 | * | 1/2015 | Seibt | ...................... | A61H 3/066 |
| | | | | | 296/178 |

FOREIGN PATENT DOCUMENTS

| CN | 2272465 | 1/1998 |
| CN | 2414713 | 1/2001 |
| CN | 2683096 | 3/2005 |
| CN | 203856015 | 10/2014 |
| EP | 2 823 797 | 1/2015 |
| EP | 2 837 561 | 2/2015 |
| JP | H05 87153 | 11/1993 |
| JP | H11-128096 | 5/1999 |

(Continued)

OTHER PUBLICATIONS

Machine Translation of JPH11-128096 (Year: 2019).*

(Continued)

*Primary Examiner* — Tuan N Nguyen
(74) *Attorney, Agent, or Firm* — Joseph M. Butscher; The Small Patent Law Group, PLLC

(57) ABSTRACT

A lavatory may include a vanity including a wash basin, and a handle assembly connected to a portion of the wash basin. The handle assembly provides an ergonomic shape that is configured to be grasped by an individual.

20 Claims, 6 Drawing Sheets

(56) References Cited

FOREIGN PATENT DOCUMENTS

| JP | 2006192108 | 7/2006 |
|---|---|---|
| JP | 2008 284042 | 11/2008 |
| RU | 35999 | 2/2004 |
| WO | WO 2014/057667 | 4/2014 |

OTHER PUBLICATIONS

Extended European Search Report for EP App. No. 15181223.7-1754, dated Feb. 17, 2016.
Communication for EP App. No. 15181223.7-1754, dated Jul. 20, 2017.
Office Action for RU 2015135242/11 (054022), dated Feb. 15, 2019.
2nd Notification of Office Action for CN 201510628613.4, dated Jul. 22, 2019.
Notice of Reasons for Rejection for JP App. No. 2015-163591, dated Jul. 11, 2019 (and English Abstract).

* cited by examiner

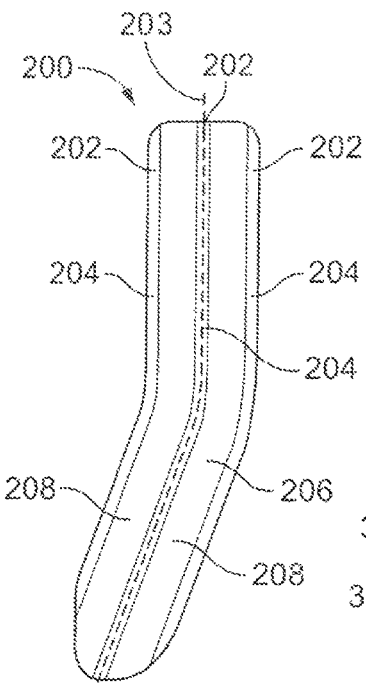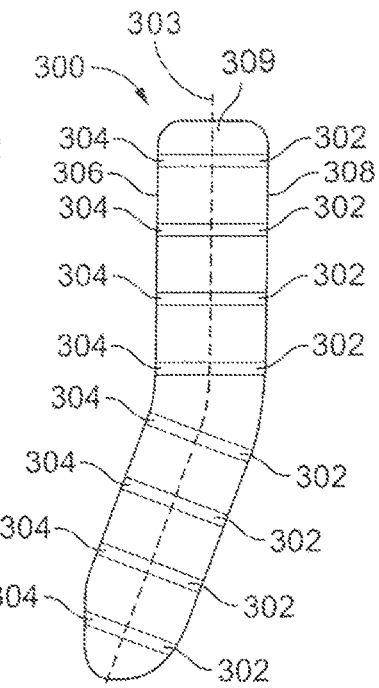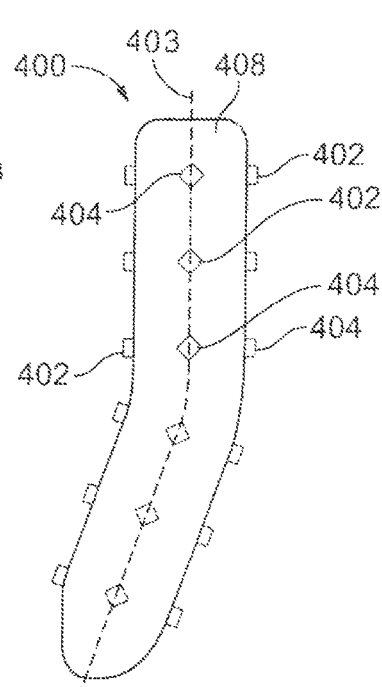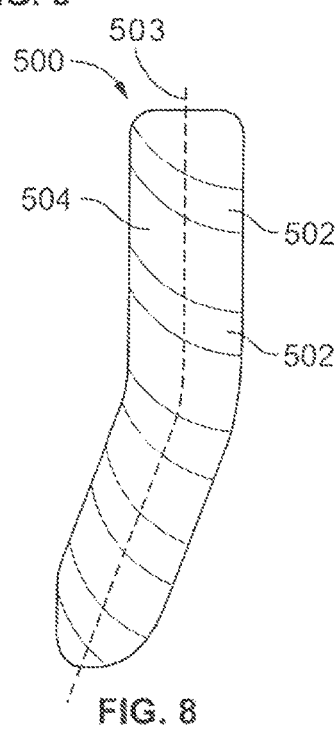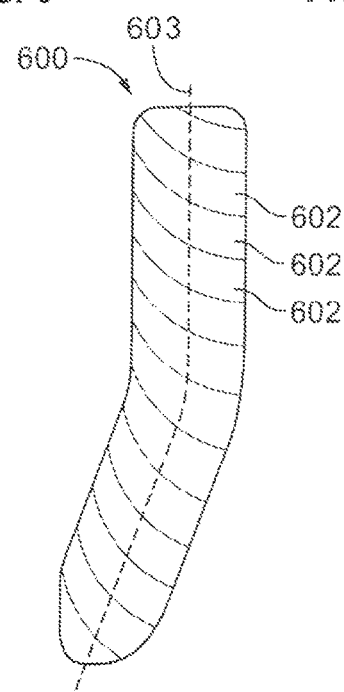

LAVATORY WASH BASIN HANDLE ASSEMBLY

BACKGROUND OF THE DISCLOSURE

Embodiments of the present disclosure generally relate to a lavatory within a confined space, such as within vehicle, such as an aircraft, and, more particularly, to a handle assembly within a lavatory.

Various vehicles may include one or more onboard lavatories. For example, commercial aircraft typically include one or more lavatories within a cabin. An aircraft lavatory typically includes a compact vanity and a toilet. The space within an aircraft lavatory is limited, as aircraft operators seek to maximize seating capacity within a limited cabin space. Due to the limited space within an aircraft lavatory, many, if not most, individuals may have difficulty stabilizing and positioning themselves therein.

Further, during periods of turbulence, an individual within the aircraft lavatory may reflexively brace his/herself by grabbing onto a portion of the vanity. In particular, it has been found that many individuals reflexively grab an outer edge of a wash basin of the vanity. However, the outer edge is typically a thin, flat surface that is not easily grasped. As an individual grasps the outer sink edge, his/her fingers may slip from the surface. As such, in order to maintain a secure grip on the outer edge, the individual typically exerts a force that may cause cramping or other discomfort in his/her hand.

Mounting separate handles to walls within an aircraft lavatory is obtrusive, and protrudes into valuable space therein. Further, handles at various points within an aircraft lavatory may not be ergonomically ideal or possible. Moreover, attempting to mount such handles to portions of the lavatory may be restricted due to other features within the lavatory. For example, if a separate handle is affixed to a door of the lavatory, the separate handle may abut into a wall of the lavatory when an individual opens the door, and the structure to which the handle is mounted may have to be reinforced, which would add extra weight to the vehicle. As such, the handle may prevent the door from being fully opened. Also, protruding handles may prevent efficient ingress and egress of individuals, particularly individuals that utilize wheelchairs. Further, components within the aircraft lavatory, such as baby changing tables, foldaway center walls, and the like, often prevent handles from being mounted thereto.

A need exists for a system that allows an individual to comfortably grasp a component within a vehicle lavatory that is not obtrusive.

SUMMARY OF THE DISCLOSURE

Certain embodiments of the present disclosure provide a vehicle lavatory that may include a vanity including a wash basin, and a handle assembly connected to a portion of the wash basin. The handle assembly provides an ergonomic shape that is configured to be grasped by an individual. In at least one embodiment, the portion of the wash basin may include an outer rim of the wash basin. The handle assembly may be configured to secure or form part of an outer rim that is straight, curved, irregularly-shaped, or the like.

The handle assembly may be separate and distinct from the wash basin. The handle assembly may be removably secured to the wash basin. In at least one other embodiment, the handle assembly may be integrally molded and formed with the portion of the wash basin.

A shape of the handle assembly may follow or otherwise conform to a contour of the portion of the wash basin. The handle assembly may include an oval or elliptical axial cross section.

The handle assembly may be formed of stainless steel. In at least one embodiment, the handle assembly may be formed of a non-porous and antimicrobial material that prevents bacterial and/or fungus growth.

The handle assembly may include a grasping surface connected to a basin-connecting interface. The basin-connecting interface may include a channel that conforms around a shape of the portion of the wash basin.

The handle assembly has a first width. The portion of the wash basin has a second width. The first width exceeds the second width.

The handle assembly may include a seal member that sealingly connects the handle assembly to the portion of the wash basin. The seal member may include, for example, a silicon fillet.

The handle assembly may also include one or more tactile members. The tactile members may be protuberances formed on a grasping surface, for example.

Certain embodiments of the present disclosure provide a handle assembly configured to stabilize an individual within a lavatory of a vehicle. The handle assembly may include a main body having a grasping surface and a basin-connecting surface. The grasping surface is ergonomically-shaped. The basin-connecting surface is configured to secure to a portion of a wash basin of the lavatory.

BRIEF DESCRIPTION OF THE DRAWINGS

FIG. 5 illustrates a top plan view of a handle assembly, according to an embodiment of the present disclosure.

FIG. 6 illustrates a top plan view of a handle assembly, according to an embodiment of the present disclosure.

FIG. 7 illustrates a top plan view of a handle assembly, according to an embodiment of the present disclosure.

FIG. 8 illustrates a top plan view of a handle assembly, according to an embodiment of the present disclosure.

FIG. 9 illustrates a top plan view of a handle assembly, according to an embodiment of the present disclosure.

DETAILED DESCRIPTION OF THE DISCLOSURE

Figure 1:
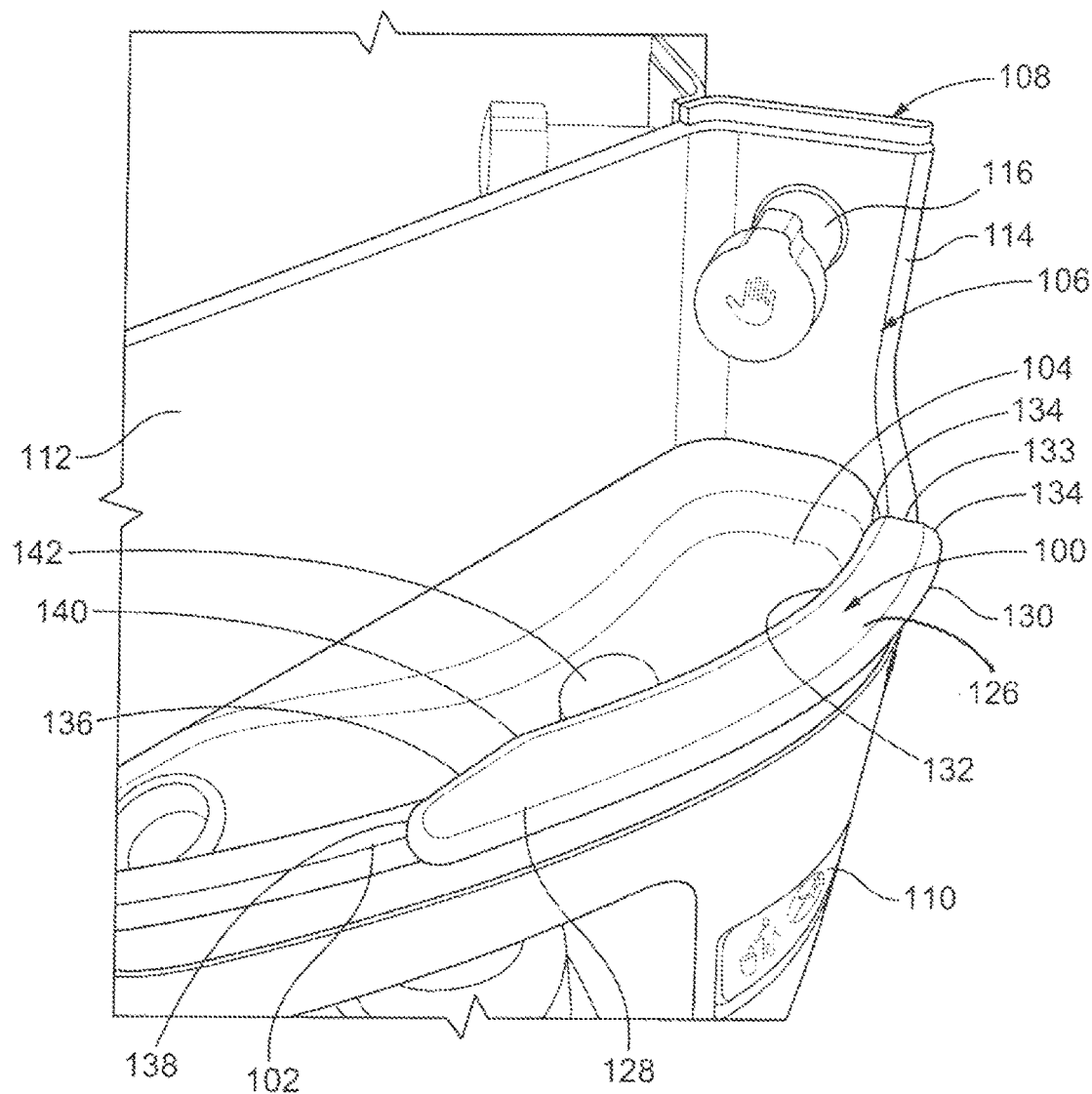
FIG. 1 illustrates a perspective top front view of a handle assembly secured to an outer rim of a wash basin of a vanity within a vehicle lavatory, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a handle assembly, such as a wash basin stabilization or assist handle, that is configured to be secured to, or be integrally molded and formed with, an outer wall or edge of a wash basin of a vehicle lavatory, such as a lavatory within a commercial aircraft. A shape of the handle assembly may conform to a shape and profile of the outer wall or edge of the wash basin. As such, the handle assembly minimally protrudes into the space of the vehicle lavatory. Because the handle assembly is positioned on the outer wall or edge of the wash basin, the handle assembly is at an area that individuals may instinctively and reflexively grasp, either to assist themselves into position within the aircraft lavatory, to stabilize themselves during unexpected vehicle motion such as experienced when an aircraft encounters air turbulence, or to provide accessibility for persons in wheelchairs or with reduced mobility.

In at least one embodiment, an ergonomic handle assembly for a vehicle lavatory includes a body having a first end and a second end, a hand contact or grasping portion, and a basin-connecting interface portion. The body may be secured (for example, may be removably attached or permanently attached) to a portion of a sink, wash basin, or the like. For example, the body may snapably or latchably secure to a rim, edge, or wall of a wash basin. In at least one other embodiment, the body may secure to the rim, edge, or wall of the wash basin through one or more fasteners, adhesives, or the like. The body may be sealingly secured to the portion of the sink, such as through a silicon fillet, caulk, or the like. The body includes an ergonomic shape that is shaped and sized to be comfortably grasped and held by a human hand. For example, the body may include a circular, oval, or elliptical axial cross-section that may be similar to an opening formed when an individual touches a distal tip of a finger to a distal tip of a thumb. The basin-connecting interface portion may include a void having a first flat area and a second flat area that is parallel to the first flat area. The first and second flat areas cooperate to stably secure the handle assembly to the wash basin. In at least one embodiment, the handle assembly has its cross-sectional centroid proximate to the top surface of a sink rim, so that no additional loads are imparted on the sink rim.

The handle assembly may be formed of plastic, metal, composite materials, or the like. In at least one embodiment, the handle assembly may be formed of stainless steel. The handle assembly may be formed of, or painted with, a material that is highly visible. The handle assembly may be formed of a non-porous and/or antimicrobial material that prevents bacterial and/or fungus growth. The handle assembly may be configured to be removed from the sink for maintenance purposes.

The hand contact or grasping portion may be coated or textured. For example, the hand contact portion may include features, such as protuberances, that are configured to prevent a hand from inadvertently slipping off the hand contact portion. The hand contact portion may include sufficient surface area so that an individual need not exert a degree of pressure that could cause discomfort within a hand.

Embodiments of the present disclosure may be used with respect to lavatories of various vehicles, such as airplanes, cars, trucks, recreational vehicles, trains, boats, and the like. Further, embodiments of the present disclosure may be used with respect to lavatories within confined spaces, even within stationary structures. Embodiments of the present disclosure provide handle assemblies that are configured to stabilize an individual within a lavatory of a vehicle. For example, each handle assembly may be grasped to safely and comfortably position an individual on and off a toilet within the lavatory, including individuals using a wheelchair. Further, each handle assembly may be grasped to securely stabilize the individual in a safe position during sudden, unexpected movement of the vehicle, such as when an aircraft experiences air turbulence.

The handle assembly includes an ergonomic profile. For example, the handle assembly may have an oval or elliptical axial cross-section that conforms comfortably to an individual's hand. The wash basin assist handle assembly is sized and shaped so as to be easily and comfortably grasped by an individual.

Figure 2:
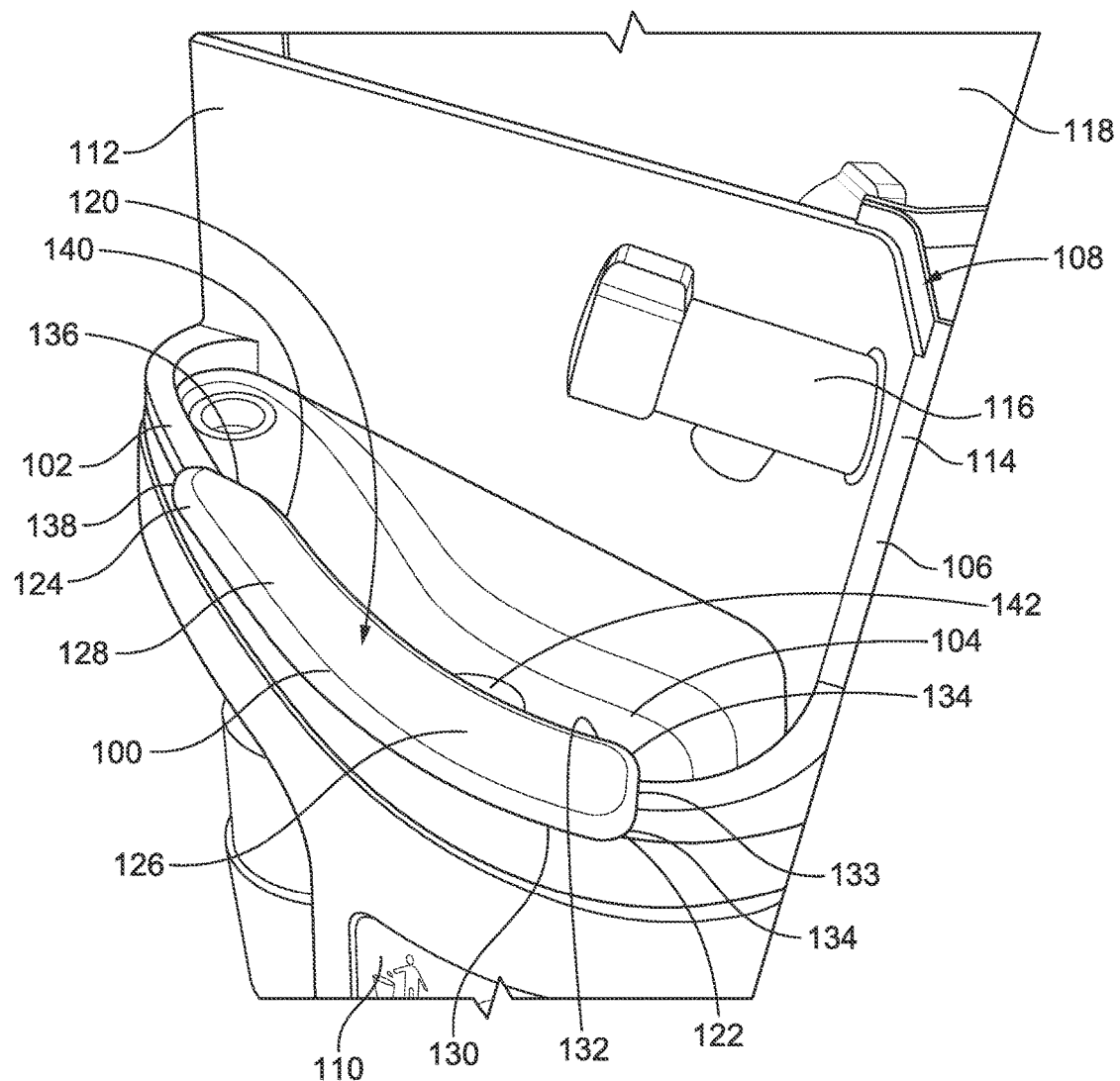
FIG. 2 illustrates a perspective top rear view of a handle assembly secured to an outer rim of a wash basin of a vanity within a vehicle lavatory, according to an embodiment of the present disclosure.

FIGS. 1 and 2 illustrate perspective top front and perspective top rear views, respectively, of a handle assembly 100 secured to an outer rim 102 of a wash basin 104 of a vanity 106 within a vehicle lavatory 108, according to an embodiment of the present disclosure. Referring to FIGS. 1 and 2, the vehicle lavatory 108 may include a toilet (not shown) in close proximity, such as within arm's length (for example, within 1 or 2 feet), to the vanity 106. The vanity 106 may include a base 110, such as a pedestal, cabinet, or the like, that supports the wash basin 104. The wash basin 104 includes the outer rim 102, which may connect to upstanding walls 112 and 114. A faucet 116 may extend from the wall 114, while a mirror 118 may be secured to the wall 112.

The outer rim 102 is proximate to an interior space within the vehicle lavatory 108 in which an individual would be positioned, such as sitting with respect to a toilet, or standing upright proximate to the wash basin 104. The outer rim 102 may generally be positioned away from the wall 112. In this manner, the outer rim 102 may represent a portion of the vanity 106 that is closest to an individual, standing upright or within a wheelchair, within the lavatory 108.

The handle assembly 100 secures to the outer rim 102. The handle assembly 100 may be formed of plastic, metal, composite materials, or the like. For example, the handle assembly 100 may be formed of stainless steel. The handle assembly 100 may be formed of a non-porous material that is resistant to microbes, such as bacteria, germs, and the like. Optionally, the handle assembly 100 may be coated with a material that is resistant to microbes. Additionally, the handle assembly 100 may be formed of a material that is readily cleanable, such as through wiping with soap and water. The handle assembly 100 may be painted with a material that is highly visible, such as fluorescent paint. Optionally, the handle assembly 100 may be etched, painted, or the like with text and/or graphics indicating the nature of the handle assembly 100. For example, the handle assembly 100 may be etched, painted, or like with text such as "ACCESSIBILITY HANDLE."

The handle assembly 100 includes a main body 120 that extends from a first end 122 to a second end 124. The handle assembly 100 includes a hand contact or grasping surface 126 on a top surface 128 that extends from the first end 122 to the second end 124. The grasping surface 126 integrally connects to a basin-connecting interface (hidden from view in FIGS. 1 and 2) that securely connects the handle assembly 100 to the outer rim 102.

As shown, the handle assembly 100 includes opposed lateral portions 130 and 132 that extend outwardly past outer surfaces of the outer rim 102. The lateral portion 130 extends outwardly from the outer rim 102 into the internal space of the lavatory 108, while the lateral portion 132 extends outwardly from the outer rim 102 toward a space over the wash basin 104.

The handle assembly 100 may conform to the shape of the outer rim 102. For example, the shape of the main body 120 may follow the contour of the outer rim 102. That is, a longitudinal axis of the main body 120 that extends from the first end 122 to the second end 124 may align with a longitudinal axis of a portion of an upper surface or edge of the outer rim 102 onto which the handle assembly 100 secures. The handle assembly 100 fits directly over and onto the outer rim 102. In this regard, the handle assembly 100 has a low profile relative to the outer rim 102. As such, the handle assembly 100 minimizes or eliminates additional structural loads that may be exerted on the outer rim 102.

As shown, the first end 122 of the handle assembly 100 may include a flat, blunted outer edge 133 that connects to the lateral portions 130 and 132 through smooth, arcuate transitions 134. The flat outer edge 133 may generally be perpendicular to the lateral portions 130 and 132.

The second end 124 may include a recessed surface 136 that inwardly angles from an outer tip 138 toward an interior edge 140. As shown, the recessed surface inwardly recedes from the outer tip 138 towards a vertical axis of a drain 142 of the wash basin 104. Alternatively, the second end 124 may not be inwardly angled, as shown. Instead, the second end 124 may be a flat blunted surface similar to the flat outer edge 133. As another alternative, the first end 122 may be inwardly angled, similar to the recessed surface 136.

As shown, the handle assembly 100 may extend on and over a portion of the outer rim 102. Alternatively, the handle assembly 100 may extend over a greater or lesser portion of the outer rim 102 than shown. Further, instead of a single handle assembly 100, multiple, smaller handle assemblies may be secured to the outer rim 102 and separated by gaps or abutting one another.

In at least one embodiment, the handle assembly 100 may be positioned at a height between 34 inches and 36 inches from the floor of the vehicle lavatory 108. In another embodiment, the handle assembly 100 may be positioned at a height between 28 inches and 44 inches from the floor of the vehicle lavatory 108. As such, the handle assembly 100 may be configured to be grasped through an overhand grip that is located below a shoulder height of a person standing or in a wheelchair. Alternatively, the handle assembly 100 may be located at various other heights.

Figure 3:
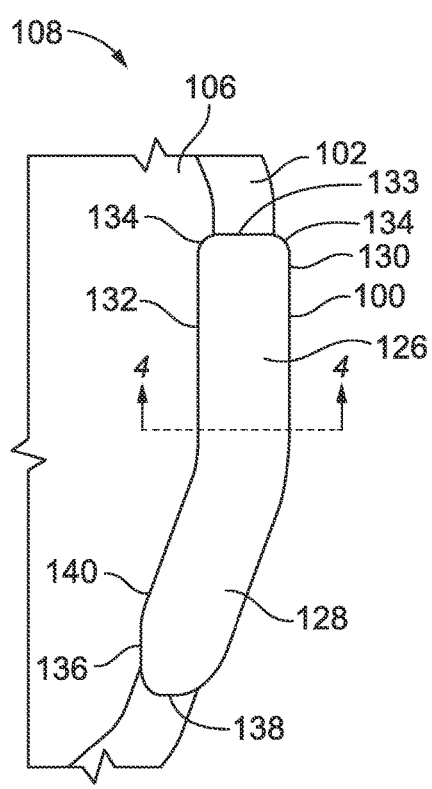
FIG. 3 illustrates a top plan view of a handle assembly secured to an outer rim of a wash basin of a vanity within a vehicle lavatory, according to an embodiment of the present disclosure.

FIG. 3 illustrates a top plan view of the handle assembly 100 secured to the outer rim 102 of the wash basin 104 of the vanity 106 within the vehicle lavatory 108, according to an embodiment of the present disclosure. As shown in FIG. 3, the handle assembly 100 is secured on and over the outer rim 102, and follows the contour of the outer rim 102.

Figure 4:
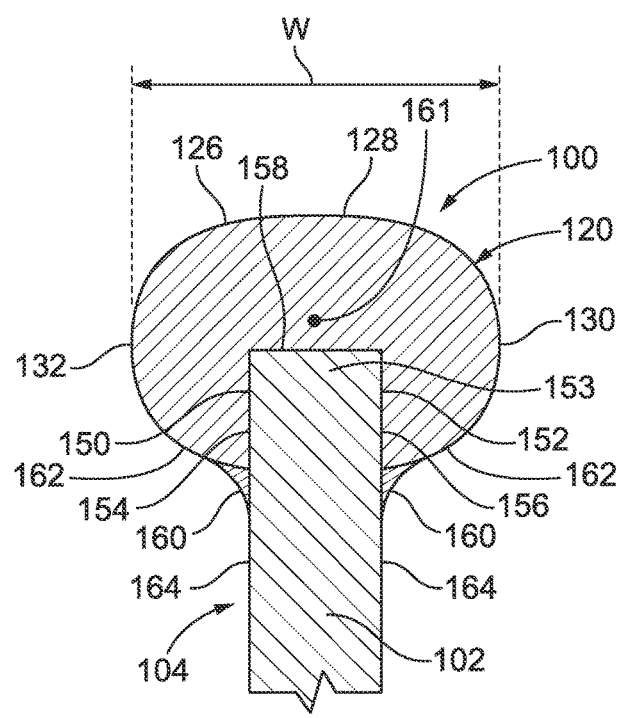
FIG. 4 illustrates an axial cross-sectional view of a handle assembly secured to an outer rim of a wash basin through line 4-4 of FIG. 3, according to an embodiment of the present disclosure.

FIG. 4 illustrates an axial cross-sectional view of the handle assembly 100 secured to the outer rim 102 of the wash basin 104 through line 4-4 of FIG. 3, according to an embodiment of the present disclosure. As noted above, the handle assembly 100 includes a basin-connecting interface 150, which may be or include a channel 152, such as a void, recessed area, or the like, that extends through and along a length of a bottom surface of the main body 120. The channel 152 is configured to receive a top edge 153 of the outer rim 102. The channel 152 may be defined by parallel side walls 154 and 156 that connect to a perpendicular top wall 158. The side walls 154 and 156 and the top wall 158 are configured to conform to reciprocal surfaces of the top edge 153 of the outer rim 102. The channel 152 may securely engage the top edge 153 of the outer rim 102 through an interference fit, for example.

A cross-sectional centroid 161 of the handle assembly 100 is proximate to the top edge 153 of the outer rim 102. For example, the centroid 161 may abut against the top edge 153, or may be with 1 inch or 2 inches from the top edge. The close proximity of the centroid 161 to the top edge 153 of the outer rim 102 ensures a stable, secure connection between the handle assembly 100 and the outer rim 102. By locating the centroid 161 proximate to the top surface of the outer rim 102, the handle assembly 100 imparts little or no additional loads on the outer rim 102. Alternatively, the centroid 161 may be further from the top edge 153 than 2 inches, for example.

The handle assembly 100 may be secured to the outer rim 102 through one or more adhesives, retention members, fasteners, or the like. For example, the basin-connecting interface 150 may be coated with an adhesive before being mounted onto the top edge 153 of the outer rim 102. Additionally, or alternatively, fasteners, such as screws, bolts, or the like, may be used to secure the handle assembly 100 to the outer rim 102.

A seal member 160, such as a silicon fillet, caulk, a rubber or elastomeric strip, or the like, sealingly engages and secures to a bottom portion 162 of the main body 120 and outer surfaces of lateral walls 164 of the outer rim 102. The seal member 160 prevents water or other moisture from infiltrating into an interface between the handle assembly 100 and the outer rim 102. The seal member 160 may extend along an entire length of the handle assembly 100. An entire lower periphery of the handle assembly 100 may include the seal member 160, which sealingly engages the outer rim 102. Alternatively, the seal member 160 may extend along a shorter length of the handle assembly 100. As another alternative, the handle assembly 100 may not include the seal member 160.

As shown, the axial cross-section of the main body 120 may be oval or elliptical. In another embodiment, the axial cross-section of the main body 120 may be circular. The oval axial cross-section provides an ergonomic profile and shape that is particularly suited for grasping by hand. For example, the ergonomic shape of the main body 120 may be similarly-shaped as an opening formed by an individual touching a distal tip of a finger to a distal tip of a thumb. As shown, the lateral portions 130 and 132 extend outwardly from exterior surfaces of the outer rim 102. As such, the handle assembly 100 is wider than the outer rim 102, thereby forming a prominent expanded rail on top of the outer rim 102. The smooth, curved surfaces of the main body 120 are easily grasped and comfortable to hold.

In contrast, a thin, flat wall of a conventional wash basin is not ergonomically-shaped. For example, if a flat or otherwise thin wall (such as that of a conventional wash basin) is grasped, a hand typically is squeezed into an uncomfortable pinching orientation, which may cause cramping or other such pain if maintained for more than a few seconds, and/or if used to exert sufficient force to maintain a secure grip on the flat or thin wall during periods of unexpected vehicle motion.

A width W of the handle assembly 100 may be, for example, 1.5 inches. It has been found that a handle assembly 100 having such a width may be easily, comfortably, and securely grasped by an individual. The width W of the handle assembly 100 may be of sufficient size, such as 1.5 inches, so as to prevent an individual from applying a force that could cause discomfort. For example, the expanded size and width of the handle assembly 100 (in relation to the outer rim 102) provides a grasping area, which may include a lower ledge, that an individual may easily grasp without pinching, such as would be the case if the individual simply grabbed onto a planar outer rim. Optionally, the width W may be greater or lesser than 1.5 inches.

The smooth, curved outer surface of the handle assembly 100 provides a shape that an individual may grasp with his/her hand, such that one or more fingers and a thumb may be anchored underneath the bottom portion 162. As such, an individual may securely grasp the handle assembly 100, and the anchored finger(s) and thumb are less susceptible to slipping upwardly off the handle assembly 100.

As shown, the handle assembly 100 may be separate and distinct from the outer rim 102. For example, the handle assembly 100 may be mounted to the outer rim 102, as described above. Alternatively, the handle assembly 100 may be integrally molded and formed along with the outer rim 102 as a single, unitary structure. For example, the wash basin 104 may be formed having the expanded, ergonomic handle assembly at a top portion of the outer rim 102.

As another alternative, the axial cross-section of the handle assembly 100 may be other shapes and sizes. For example, the axial cross-section may be rectangular, an inverted triangle (such as that base of the triangle is at a top surface, and a connecting apex is at or proximate to a basin-connecting interface), or the like. The axial cross-section may be sized and shaped so as to allow one or more fingers and a thumb of an individual to be anchored to a bottom surface.

FIG. 5 illustrates a top plan view of a handle assembly 200, according to an embodiment of the present disclosure. The handle assembly 200 may be similar to the handle assembly 100, and may include one or more tactile members 202. For example, a plurality of tactile members 202 in the form of longitudinal protuberances 204, such as ridges, ribs, fins, or the like, may extend over a length of a grasping surface 206. The longitudinal protuberances 204 may be aligned with (such as parallel to) a longitudinal axis 203 of the handle assembly 200. The protuberances 204 may be separated by spaces 208. More or less longitudinal protuberances 204 than shown may be used. The protuberances 204 provide gripping features that may reduce the possibility of a hand inadvertently slipping off the handle assembly 200.

FIG. 6 illustrates a top plan view of a handle assembly 300, according to an embodiment of the present disclosure. The handle assembly 300 may be similar to the handle assembly 100, and may include one or more tactile members 302. For example, a plurality of tactile members 302 in the form of laterally-extending protuberances 304, such as ridges, ribs, fins, or the like, may extend between lateral portions 306 and 308 of a grasping surface 309. The protuberances 304 may be perpendicular to a longitudinal axis 303 of the handle assembly 300. More or less lateral protuberances 304 than shown may be used. The protuberances 304 provide gripping features that may reduce the possibility of a hand inadvertently slipping off the handle assembly 300.

FIG. 7 illustrates a top plan view of a handle assembly 400, according to an embodiment of the present disclosure. The handle assembly 400 may be similar to the handle assembly 100, and may include one or more tactile members 402. For example, a plurality of tactile members 402 in the form of radially-extending protuberances 404, such as studs, nubs, hemispheres, or the like, may radially extend from a grasping surface 408. At least some of the protuberances 404 may be centered about a longitudinal axis 403 of the handle assembly 400. More or less protuberances 404 than shown may be used. The protuberances 404 provide gripping features that may reduce the possibility of a hand inadvertently slipping off the handle assembly 400.

FIG. 8 illustrates a top plan view of a handle assembly 500, according to an embodiment of the present disclosure. The handle assembly 500 has a longitudinal axis 503 and is similar to the handle assembly 300, except that protuberances 502 may spirally extend over a grasping surface 504. The spiral pattern may better conform to a shape of a hand that is approaching from an angle, such as if an individual is seated on a toilet within a vehicle lavatory. The pitch between the protuberances 502 may be regular, or varied.

FIG. 9 illustrates a top plan view of a handle assembly 600, according to an embodiment of the present disclosure. The handle assembly 600 has a longitudinal axis 603 and is similar to the handle assemblies 300 and 500, except that protuberances 602 may be formed by a ribbon or tape that spirally winds over the grasping surface, or otherwise around the handle assembly 600.

Figure 10:
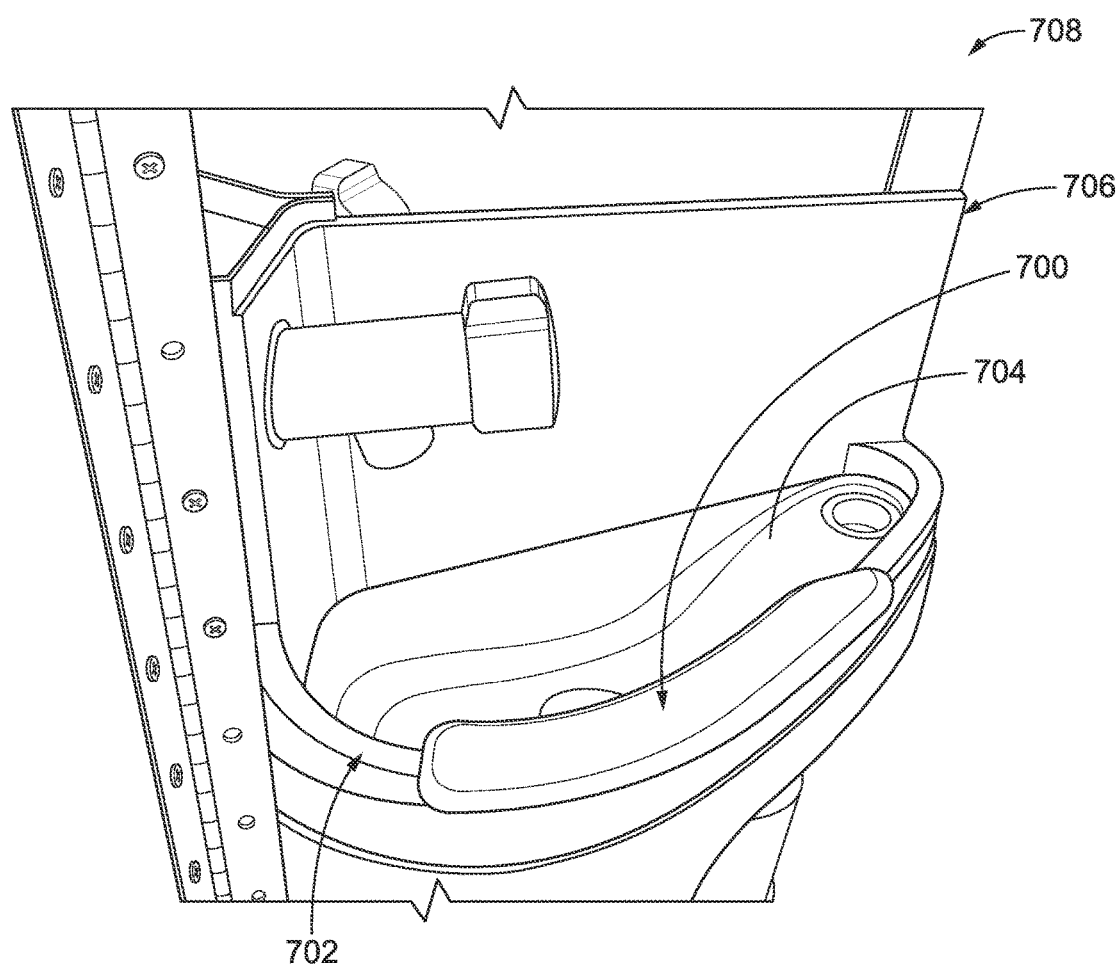
FIG. 10 illustrates a perspective top front view of a handle assembly secured to an outer rim of a wash basin of a vanity within a vehicle lavatory, according to an embodiment of the present disclosure.

FIG. 10 illustrates a perspective top front view of a handle assembly 700 secured to an outer rim 702 of a wash basin 704 of a vanity 706 within a vehicle lavatory 708, according to an embodiment of the present disclosure. The handle assembly 700 is similar to the handle assemblies described above, except that the handle assembly 700 is curved in an opposite direction to be fit to the outer rim 702, which may provide a mirror image of the outer rim 102, for example. In short, embodiments of the present disclosure provide handle assemblies that may be sized and shaped to secure to any portion of any wash basin of a vehicle lavatory.

Figure 11:
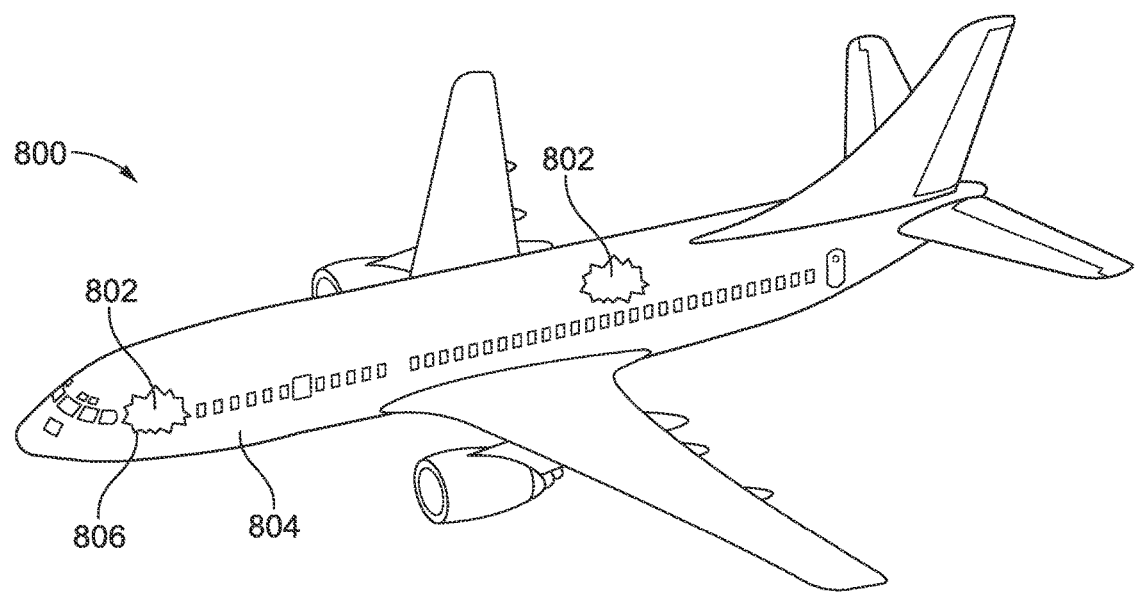
FIG. 11 illustrates a perspective top view of an aircraft, according to an embodiment of the present disclosure.

FIG. 11 illustrates a perspective top view of an aircraft 800, according to an embodiment of the present disclosure. The aircraft 800 is an example of a vehicle that includes one or more vehicle lavatories 802, as described above. The aircraft 800 includes a fuselage 804 that includes a cabin 806 in which the lavatories 802 are positioned. The aircraft 800 is but one example of a vehicle that may include lavatories 802 that utilize the handle assemblies, as described above.

As described above, embodiments of the present disclosure provide handle assemblies that may be secured to, or integrally formed with, an outer rim of a wash basin of a vanity of a vehicle lavatory. The handle assemblies are ergonomically-shaped and easy to grasp and securely hold. The handle assemblies may be mounted to the outer rim of the wash basin, which provides an area within the vehicle lavatory that is readily reached, and instinctively and reflexively grasped during periods of unexpected movement of the vehicle (such as when an aircraft experiences turbulence).

Embodiments of the present disclosure provide handle assemblies that are easily and comfortably grasped by an individual. Further, because the handle assemblies may be secured to a portion of the wash basin, such as an outer edge thereof, the handle assemblies are not obtrusive, and do not significantly protrude into the space of the vehicle lavatory.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A vehicle lavatory comprising:
   a vanity including a wash basin; and
   a handle assembly mounted over and onto a portion of the wash basin, wherein the handle assembly provides an ergonomic shape that is configured to be grasped by an individual, wherein the portion of the wash basin includes an outer rim of the wash basin, wherein the handle assembly has a complimentary shape to the outer rim of the wash basin, wherein the handle assembly receives and securely fits over and onto the outer rim of the wash basin, and wherein the handle assembly includes a seal member that sealingly connects the handle assembly to the portion of the wash basin, wherein the seal member sealingly engages and secures to a bottom portion of a main body of the handle assembly and outer surfaces of lateral walls of the outer rim of the wash basin, wherein the seal member downwardly curves away from the bottom portion of the main body and onto the outer surfaces of the lateral walls of the outer rim of the wash basin, and wherein the seal member prevents water or other moisture from infiltrating into an interface between the handle assembly and the outer rim.

2. The vehicle lavatory of claim 1, wherein the handle assembly is separate and distinct from the wash basin, and wherein the handle assembly is removably secured to the wash basin.

3. The vehicle lavatory of claim 1, wherein the handle assembly is integrally molded and formed with the portion of the wash basin.

4. The vehicle lavatory of claim 1, wherein a shape of the handle assembly follows a contour of the portion of the wash basin.

5. The vehicle lavatory of claim 1, wherein the handle assembly includes an oval axial cross section.

6. The vehicle lavatory of claim 1, wherein the handle assembly is formed of stainless steel.

7. The vehicle lavatory of claim 1, wherein the handle assembly is formed of a non-porous and antimicrobial material.

8. The vehicle lavatory of claim 1, wherein the handle assembly includes a grasping surface connected to a basin-connecting interface, wherein the basin-connecting interface includes a channel that conforms around and over a shape of the portion of the wash basin.

9. The vehicle lavatory of claim 1, wherein the handle assembly has a first width, and wherein the portion of the wash basin has a second width, wherein the first width exceeds the second width.

10. The vehicle lavatory of claim 1, wherein the handle assembly includes one or more tactile members including one or more protuberances outwardly extending from the main body.

11. The vehicle lavatory of claim 1, wherein the handle assembly is formed of plastic, metal, or a composite material.

12. The vehicle lavatory of claim 1, wherein the seal member comprises one or more of a silicon fillet, caulk, or an elastomeric strip.

13. A handle assembly configured to assist an individual within a lavatory, the handle assembly comprising:
    a main body having a grasping surface and a basin-connecting surface, wherein the grasping surface is ergonomically-shaped, and wherein the basin-connecting surface secures over and onto an outer rim of a wash basin of the lavatory, wherein the handle assembly has a complimentary shape to the outer rim of the wash basin, and wherein the handle assembly receives and securely fits over and onto the outer rim of the wash basin; and
    a seal member that is configured to sealingly connect the handle assembly to the outer rim of the wash basin, wherein the seal member sealingly engages and secures to a bottom portion of a main body of the handle assembly, wherein the seal member is configured to sealingly engage and secure to outer surfaces of lateral walls of the outer rim of the wash basin, wherein the seal member downwardly curves away from the bottom portion of the main body and onto the outer surfaces of the lateral walls of the outer rim of the wash basin, and wherein the seal member prevents water or other moisture from infiltrating into an interface between the handle assembly and the outer rim.

14. The handle assembly of claim 13, wherein a shape of the main body follows a contour of the outer rim of the wash basin.

15. The handle assembly of claim 13, wherein the grasping surface includes an oval axial cross section.

16. The handle assembly of claim 13, wherein the main body is formed of stainless steel.

17. The handle assembly of claim 13, wherein the main body is formed of a non-porous and antimicrobial material.

18. The handle assembly of claim 13, wherein the handle assembly includes one or more tactile members including one or more protuberances outwardly extending from the main body.

19. The handle assembly of claim 13, wherein the seal member comprises one or more of a silicon fillet, caulk, or an elastomeric strip.

20. A lavatory comprising:
a vanity including a wash basin; and
a handle assembly formed of a non-porous and antimicrobial material, wherein the handle assembly is mounted over and onto an outer rim of the wash basin, wherein the handle has a complimentary shape to the outer rim of the wash basin, wherein the handle assembly receives and securely fits over and onto the outer rim of the wash basin, wherein a centroid of the handle assembly is proximate to an upper surface of the outer rim, wherein the handle assembly provides an ergonomic shape having an oval cross-section that is configured to be grasped by an individual, wherein a shape of the handle assembly follows a contour of the outer rim of the wash basin, wherein the handle assembly includes: (a) a seal member that sealingly connects the handle assembly to the outer rim of the wash basin, and (b) a grasping surface connected to a basin-connecting interface, wherein the basin-connecting interface includes a channel that conforms over and around a shape of the outer rim of the wash basin, wherein the handle assembly has a first width, and wherein the outer rim of the wash basin has a second width, wherein the first width exceeds the second width.

* * * * *